(12) United States Patent
Dopper

(10) Patent No.: US 8,840,697 B2
(45) Date of Patent: Sep. 23, 2014

(54) DISC FOR A DISC STACK SEPARATOR FOR CRANKCASE BREATHING SYSTEM

(75) Inventor: Jasper Den Dopper, Hooge Zwaluwe (NL)

(73) Assignee: Daf Trucks N.V., Eindhoven (NL)

( * ) Notice: Subject to any disclaimer, the term of this patent is extended or adjusted under 35 U.S.C. 154(b) by 998 days.

(21) Appl. No.: 12/920,170

(22) PCT Filed: Mar. 2, 2009

(86) PCT No.: PCT/NL2009/000051
§ 371 (c)(1),
(2), (4) Date: Nov. 17, 2011

(87) PCT Pub. No.: WO2009/108046
PCT Pub. Date: Sep. 3, 2009

(65) Prior Publication Data
US 2012/0240536 A1    Sep. 27, 2012

(30) Foreign Application Priority Data

Feb. 29, 2008 (NL) ........................................ 2001336
Dec. 1, 2008 (NL) ........................................ 2002268

(51) Int. Cl.
| | | |
|---|---|---|
| *B01D 45/08* | (2006.01) | |
| *F01M 13/04* | (2006.01) | |
| *B04B 7/14* | (2006.01) | |
| *B01D 45/14* | (2006.01) | |
| *B04B 5/12* | (2006.01) | |

(52) U.S. Cl.
CPC .................. *B04B 7/14* (2013.01); *F01M 13/04* (2013.01); *F01M 2013/0422* (2013.01); *B04B 2005/125* (2013.01); *B04B 5/12* (2013.01); *B01D 45/14* (2013.01); *Y10S 55/19* (2013.01)
USPC ........................................ 55/405; 55/DIG. 19

(58) Field of Classification Search
CPC ........ B01D 45/00; B01D 45/04; B01D 45/08; B01D 45/12; B01D 45/14; B01D 45/16; B01D 46/00; B01D 46/26; B01D 53/24; B01D 59/20
USPC .......... 55/405, 434, 442, 443, 447, 459.1, 461
See application file for complete search history.

(56) References Cited

U.S. PATENT DOCUMENTS

| | | | | |
|---|---|---|---|---|
| 4,142,671 A | * | 3/1979 | Ivin et al. ........................ | 494/73 |
| 4,173,458 A | * | 11/1979 | Stiles .............................. | 55/405 |
| 5,720,705 A | * | 2/1998 | Inge et al. ...................... | 494/71 |
| 5,733,239 A | | 3/1998 | Inge et al. | |

(Continued)

FOREIGN PATENT DOCUMENTS

| | | | |
|---|---|---|---|
| DE | 102004030910 | * | 1/2006 |
| EP | 1772193 | | 4/2007 |

(Continued)

*Primary Examiner* — Duane Smith
*Assistant Examiner* — Sonji Turner
(74) *Attorney, Agent, or Firm* — Banner & Witcoff, Ltd.

(57) ABSTRACT

A disc for a disc stack separator for a breathing system of a crankcase space of a combustion engine of a vehicle has an annular conical section and a central part located therein and having a plurality of openings. The conical section is provided on one side with ribs which are curved from the inner periphery of the conical section to the outer circumference of the conical section.

4 Claims, 2 Drawing Sheets

(56) References Cited

U.S. PATENT DOCUMENTS

| | | | |
|---|---|---|---|
| 7,410,457 B2 * | 8/2008 | Heinrich | 494/70 |
| 8,308,626 B2 * | 11/2012 | Klintenstedt | 494/64 |
| 2004/0025482 A1 | 2/2004 | Borgstroem et al. | |
| 2004/0040442 A1 * | 3/2004 | Franzen et al. | 95/270 |

FOREIGN PATENT DOCUMENTS

| | | |
|---|---|---|
| FR | 2267153 | 6/1967 |
| GB | 847380 | 9/1960 |
| WO | WO2007/114766 | 10/2007 |

* cited by examiner

DISC FOR A DISC STACK SEPARATOR FOR CRANKCASE BREATHING SYSTEM

FIELD OF THE INVENTION

The invention relates to a disc for a disc stack separator, more particularly, for a disc stack separator for a breathing system of a crankcase space of a combustion engine of a vehicle. The disc comprises an annular conical section and a central part located therein and having at least one opening, which conical section is provided on one side with a plurality of ribs spaced from each other which are curved from the inner periphery to the outer circumference of the conical section.

STATE OF THE ART

A disc of this general type is known in the art. In vehicles with a combustion engine provided with a disc stack separator comprising such discs for cleaning the air in a crankcase space of the combustion engine it has turned out that the contamination outlet opening of the disc stack separator is clogged with the lapse of time by soot particles with all ensuing ill effects. One has not yet been able to establish the cause of the building up of these soot particles and efforts are made to find the cause outside the disc stack separator.

SUMMARY OF THE INVENTION

It is an object of the invention to provide a solution to the problem described above. To this end the invention is characterised in that parts of the conical section bordering on the spherical sides of the ribs are modified to such an extent that soot building-up on the discs is reduced or even avoided. The invention is based on the recognition that the problem is caused by soot deposits on the discs of the disc stack separator which, when they increase in size with the lapse of time, come loose from the discs and cause clogging to occur in the outlet opening. Many modifications are possible by which the soot deposits can be reduced or even avoided.

An embodiment of the disc according to the invention is characterised in that the shape of the top and/or bottom side of the sections of the conical section bordering on the spherical sides is adapted. This is one of the possible modifications with which soot deposits can be avoided. The modified form of these parts can be established by experiment.

Another embodiment of the disc according to the invention is characterised in that the conical section of the disc has recesses bordering on the spherical sides of the ribs and bordering on the outer circumference of the disc. In this embodiment parts of the conical section of the disc bordering on the spherical sides and bordering on the outer circumference are removed. It has turned out that at these very spots soot deposits are found. A removal of these parts reduces or even avoids soot deposits occurring on the disc.

The invention also relates to a disc stack separator, more particularly, for a breathing system of a crankcase space of a combustion engine of a vehicle, comprising a housing with a rotary rotor therein carried in a bearing which comprises a plurality of discs axially arranged on top of each other, which housing has an outside space radially located outside the rotor, as well as an inside space located in the centre of the rotor, which housing further has an intake opening for exhaust gas, which intake opening is connected to the outside space, and a contamination outlet opening, which is also connected to the outside space.

With respect to the disc stack separator, the invention is characterised in that the discs of the disc stack separator are designed according to the invention.

BRIEF DESCRIPTION OF THE DRAWINGS

The following description relating to the appended drawings, the whole given by way of non-limiting example of the disc stack separator according to the invention comprising discs according to the invention, will provide better understanding of how the invention can be realised, in which.

DETAILED DESCRIPTION OF THE DRAWINGS

Figure 1:
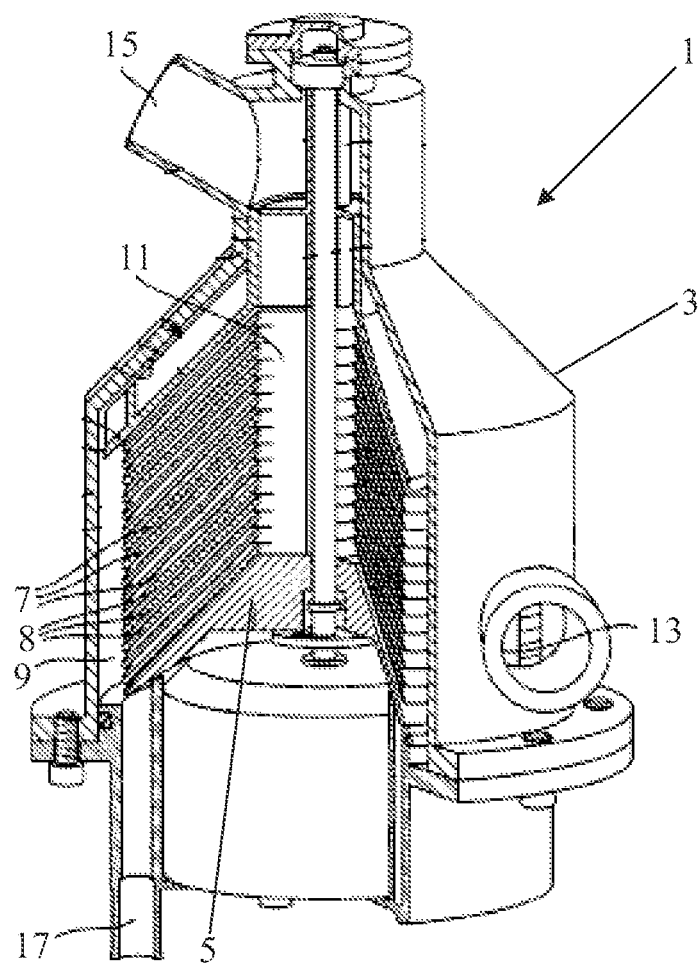
FIG. 1 shows an embodiment of the disc stack separator.

FIG. 1 shows an embodiment of the disc stack separator according to the invention for a breathing system of a crankcase of a combustion engine of a vehicle. The disc stack separator 1 has a housing 3 with a rotary rotor 5 therein carried in a bearing, which rotor 5 comprises a plurality of discs 7 axially arranged on top of each other. Between the discs there are narrowed canals 8. The housing 3 has an outside space 9 radially located outside the rotor, as well as an inside space 11 located in the centre of the rotor. The housing 3 further has an intake opening 13 for exhaust gas, which opening leads into the outside space 9, and has an outlet opening 15 for cleaned air, which leads into the inside space 11, and a contamination outlet opening 17 which also leads into the outside space 9.

Figure 2:
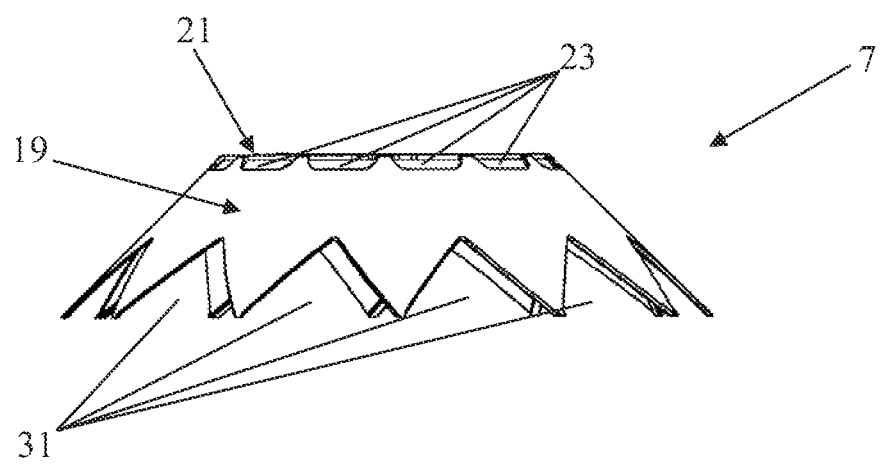
FIG. 2 shows a side view of a disc of the disc stack separator.
Figure 3:
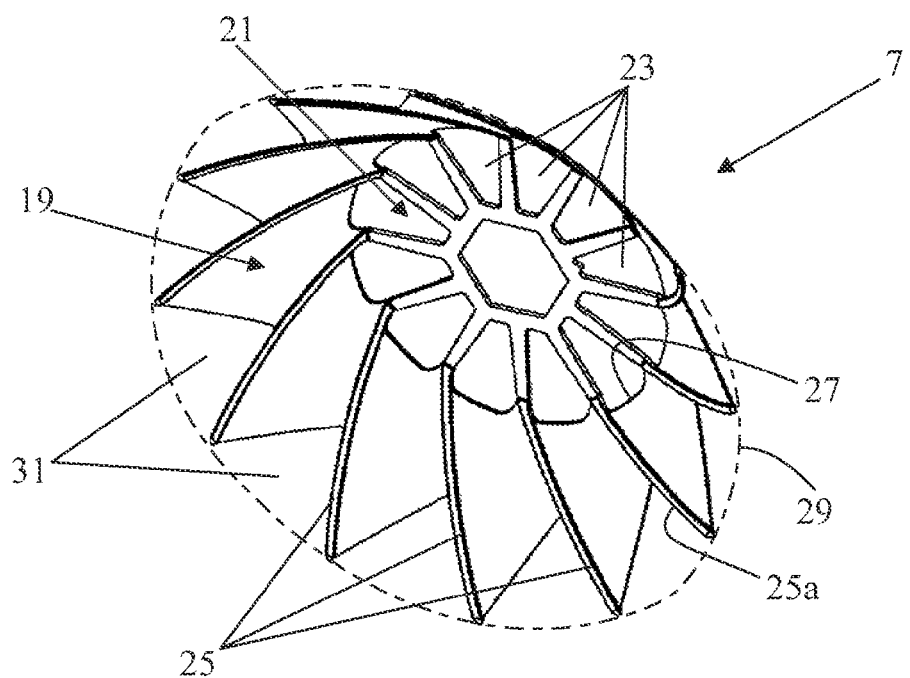
FIG. 3 shows a perspective view of the disc.
Figure 4:
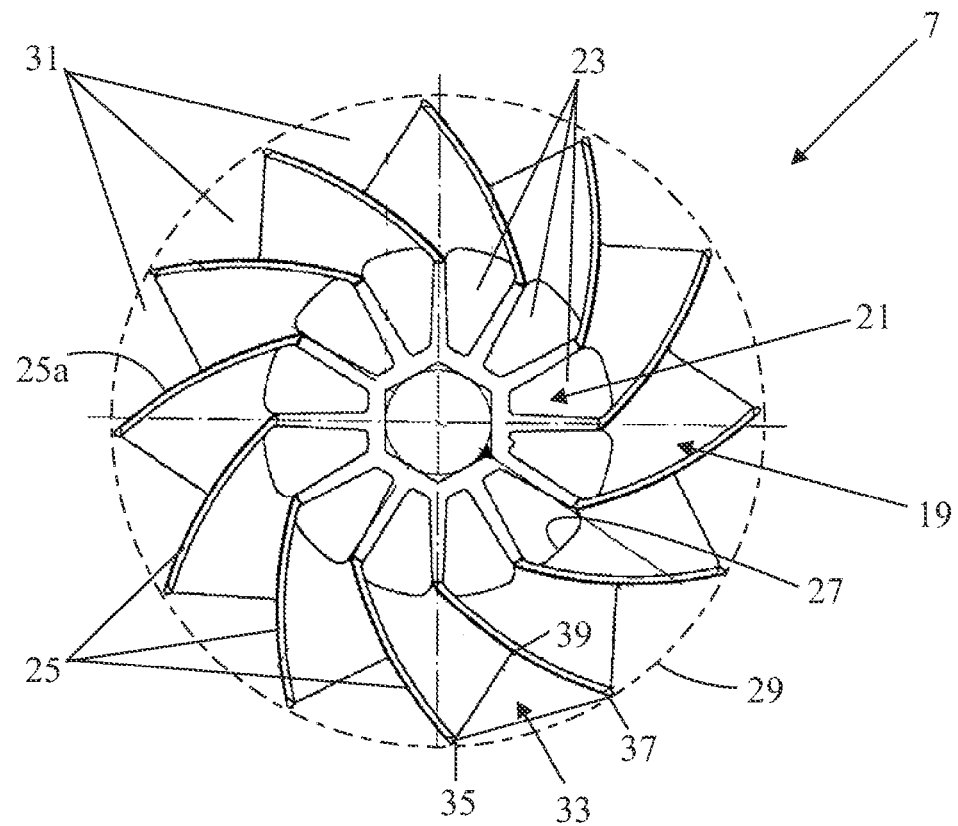
FIG. 4 shows a bottom view of the disc.

In FIGS. 2, 3 and 4 is shown a disc 7 of the disc stack separator in side view, perspective view and bottom view respectively. The disc 7 has an annular conical section 19 and located inside it a central part 21 provided with a plurality of openings 23. The conical section 19 is provided on one side with a plurality of ribs 25 spaced from each other (see FIGS. 3 and 4) which are curved from the inner periphery 27 of the conical section to the outer circumference 29 of the conical section. The conical section 19 of the disc has recesses 31 bordering on the spherical sides 25a of the ribs and bordering on the outer circumference 29 of the disc. The recesses 31 have in essence the form of a triangle 33 (see FIG. 4), whose two corners 35 and 37 are located in the place of the ends of two neighbouring ribs on the outer circumference of the disc and the third corner 39 is located on or near the point of intersection of a perpendicular from the corner 35 on one of the neighbouring ribs to the spherical side of the other rib.

Albeit the invention has been described in the foregoing based on the drawings, it should be observed that the invention is not by any manner or means restricted to the embodiment shown in the drawings. The invention also extends to all embodiments deviating from the embodiment shown in the drawings within the spirit and scope defined by the claims. For example, the disc may, in lieu of or in addition to recesses also have an adapted form of the top and/or bottom side of the parts of the conical section that border on the spherical sides of the ribs.

What is claimed is:

1. A disc for a disc stack separator for a breathing system of a crankcase space of a combustion engine, the disc comprising: an annular conical section and a central part located therein and having at least one opening, which conical section is provided on one side with a plurality of ribs spaced from each other, which ribs each are curved from an inner periphery to an outer circumference of the conical section, wherein the annular conical section of the disc has recesses bordering on spherical sides of the ribs and bordering on the outer circumference of the disc.

2. A disc as claimed in claim 1, wherein the recesses are formed as a triangle, having two corners located at ends of two neighboring ribs on the outer circumference of the disc and a third corner located on or near a point of intersection of a perpendicular from a corner on one of the neighboring ribs to the spherical side of the other rib.

3. A disc stack separator for a breathing system of a crankcase space of a combustion engine, the disc stack separator comprising;
   a housing with a rotary rotor therein carried in a bearing wherein the rotary rotor comprises a plurality of discs axially arranged on top of each other, which housing has an outside space radially located outside the rotary rotor, as well as an inside space located in the center of the rotor, wherein the housing further has an intake opening for exhaust gas, which intake opening is connected to the outside space, and an outlet opening for cleaned air, which is connected to the inside space, and a contamination outlet opening which is also connected to the outside space;
   wherein each of the plurality of discs comprises an annular conical section and a central part located therein and having at least one opening, which conical section is provided on one side with a plurality of ribs spaced from each other, which ribs each are curved from an inner periphery to an outer circumference of the conical section and defining a spherical side, wherein the annular conical section of the disc has recesses bordering on spherical sides of the ribs and bordering on the outer circumference of the disc.

4. A disc stack separator as claimed in claim 3, wherein the recesses are formed as a triangle, having two corners located at ends of two neighboring ribs on the outer circumference of the disc and a third corner located on or near a point of intersection of a perpendicular from a corner on one of the neighboring ribs to the spherical side of the other rib.

* * * * *